United States Patent [19]

Partridge, III

[11] Patent Number: 5,550,915
[45] Date of Patent: Aug. 27, 1996

[54] APPARATUS FOR USE IN COMPLETING TELEPHONE CALLS

[75] Inventor: B. Waring Partridge, III, Mendham, N.J.

[73] Assignee: Lucent Technologies, Inc., Murray Hill, N.J.

[21] Appl. No.: 86,963

[22] Filed: Jul. 2, 1993

[51] Int. Cl.⁶ .................................................. H04M 1/27
[52] U.S. Cl. .......................... 379/355; 379/356; 379/112; 379/173
[58] Field of Search ................................ 379/130, 112, 379/114, 115, 355, 354, 216, 201, 113, 131, 140, 141, 172, 356, 171, 173

[56] References Cited

U.S. PATENT DOCUMENTS

| | | | |
|---|---|---|---|
| 4,565,903 | 1/1986 | Riley | 379/201 |
| 4,751,728 | 6/1988 | Treat | 379/114 |
| 4,825,463 | 4/1989 | Miura | 379/355 |
| 4,870,679 | 9/1989 | Hanna | 379/355 |
| 4,924,496 | 5/1990 | Figa | 379/355 |
| 4,964,159 | 10/1990 | Son | 379/355 |
| 5,119,417 | 6/1992 | Suzuki | 379/355 |
| 5,157,719 | 10/1992 | Waldman | 379/355 |
| 5,210,790 | 5/1993 | Lin | 379/355 |
| 5,341,415 | 8/1994 | Baran | 379/201 |

*Primary Examiner*—Jeffery Hofsass
*Assistant Examiner*—Scott Wolinsky

[57] ABSTRACT

A telephone station set is arranged to automatically prefix calls with the access code of a particular, preselected IXC. In one embodiment, the telephone station set is arranged to have at least one locking button that corresponds to an IXC and whenever the locking button is in the selected state, any calls originated from that telephone station set are automatically prefixed with the access code of the IXC to which the button corresponds. Whenever there aren't any IXC buttons selected, only those digits corresponding to the buttons dialed by the calling party are transmitted to the LEC. In another embodiment, the telephone station set incorporates a slide switch having IXC positions and a "No IXC" position. Positioning the slide switch at an IXC position causes calls dialed from the telephone station set to be prefixed by the IXC access code of the corresponding IXC while positioning the slide switch at the "No IXC" position causes only those digits corresponding to the buttons dialed by the calling party to be transmitted to the LEC. In yet another embodiment of the invention, a particular IXC, or "No IXC" is selected from a menu provided by the telephone station set. If an IXC is selected from the menu, calls dialed from the telephone station set are prefixed by the selected IXC's access code. If "No IXC" is selected from the menu, the telephone station set transmits to the LEC only those digits corresponding to the buttons dialed by the calling party.

19 Claims, 5 Drawing Sheets

APPARATUS FOR USE IN COMPLETING TELEPHONE CALLS

TECHNICAL FIELD

This invention relates to the processing of telephone calls.

BACKGROUND OF THE INVENTION

In the United States, telephone service is provided by multiple providers or carriers. Some calls are handled by one service provider, e.g., a local call completed between two wired telephone stations. Other calls, e.g., long-distance calls, require multiple service providers to cooperate for their completion.

The initial carrier providing telephone service is a local service provider, illustratively a local exchange carrier (LEC), such as New Jersey Bell, but also including cellular (wireless), cable and any so-called "dial-tone provider" or "first contact service provider", all such being referred to herein as local service providers. The second carrier is typically, but not necessarily, a long-distance-or so-called interexchange—telephone carrier. For example, presently, for a long-distance telephone call between wired telephone subscribers, the local service providers serving the calling and called telephones are LECs which are interconnected by a long-distance, or interexchange, carrier (IXC). In the United States, AT&T, MCI and Sprint axe three such IXCs. In another example, for a local call from a mobile telephone to a wired telephone station, the local service provider is a cellular service provider while the second carrier could be a LEC that is connecting the network of the cellular service provider to a called party at the wired telephone station. Thus, it is possible for a telecommunications carrier to serve multiple roles, e.g., being the local service provider for some calls while being a second carrier for other calls.

Each telephone subscriber of a local service provider has associated with his telephone service a presubscribed default second carrier that was selected by or for the subscriber. The presubscribed default second carrier carries multiple-carrier calls originated from the subscriber's telephone unless the local service provider is instructed otherwise by way of the call-by-call entry of a telecommunications carrier code indicating which telecommunications carrier should carry the particular call. For any call for which a telecommunications carrier code is not entered, the default second carrier is typically identified based on the particular telephone link—illustratively represented herein by a wired telephone line but also including wireless (cellular), fiber optic or cable connections and any other link provided to connect telephones to local service providers-on which the local service provider received the call.

Continuing with the above-described interexchange call example, which represents the most common scenario at present, each subscriber to local telephone service from a LEC has associated with his telephone line a "primary interexchange carrier," or PIC. The local subscriber is said to be "PIC'd" to the associated IXC. The interexchange carrier to which a subscriber is PIC'd will be used by default to complete interexchange calls originated from his telephone line unless the LEC is instructed otherwise. Such instruction is given when the subscriber enters, on a call-by-call basis, prior to dialing the called telephone number, a telecommunications carrier code, illustratively an IXC access code, corresponding to the desired IXC. One such IXC access code is "10 2 8 8" (10 A T T) corresponding to AT&T.

Specifically, when a long-distance call is initiated by the subscriber from his telephone line, and no access code is entered prior to the dialing of the called telephone number, the call is routed through the network of the originating subscriber's LEC, over the network of the PIC'd IXC and, ultimately, through the network of the LEC which has as one of its subscribers the terminating subscriber. Alternatively, a subscriber may initiate a long-distance call by dialing, prior to supplying the called telephone number, an IXC access code that indicates which of the IXCs he wishes to carry his call. Upon receipt of the access code by a switch of the LEC serving the caller, it is recognized that the caller wishes his call to be carried over the IXC corresponding to the received access code. Accordingly, the LEC routes the caller's call to a trunk connecting the LEC to the IXC indicated by the access code, regardless of the IXC to which the caller's telephone line is PIC'd. Thereafter, the LEC passes the called telephone number to the selected IXC. It is noted that the supplying of an IXC access code typically indicates the selection by the caller of an IXC other than the one that he is PIC'd to, but occasionally it may indicate the same IXC to which the caller is PIC'd.

According to prior art arrangements, the information indicating whether a call was routed to a particular telecommunications carrier because a telecommunications carrier code was supplied by the caller, as opposed to the caller having selected that particular telecommunications career by default, is never conveyed to the particular telecommunications carrier. Such information could prove useful and valuable to a telecommunications carrier, especially in the area of providing special services. Therefore, in accordance with the principles described in concurrently filed U.S. patent application Ser. No. 08/086,975, if a telecommunications carrier code specifying a particular telecommunications carrier is supplied by a caller, the network of the local service provider routing such a can to the specified telecommunications carrier is arranged to transmit to the network of the selected telecommunications carrier an indication that a telecommunications carrier code was supplied by the caller to the local service provider. For example, the indication is transmitted as a signaling system 7 (SS7) message, or a portion thereof. Moreover, the local service provider may also provide an indication that the carrier whose telecommunications carrier code was entered is not the carrier that would have been selected by default for the calling telephone line.

Furthermore, in accordance with the principles described in concurrently filed U.S. patent application Ser. No. 08/086, 956, a telecommunications carrier is arranged to provide different call treatment for a call, e.g., different call features or services, when the telecommunications carrier receives an indication that the telecommunications carrier's telecommunications carrier code was entered by the caller, as compared to the treatment the telecommunications carrier provides for the same call when such an indication is not received. According to one such service, the "follow me anywhere" service, if a caller placing a call to the subscriber's telephone prefixes the call with the telecommunications carrier code of the telecommunications carrier, the telecommunications carrier completes the call to the telephone corresponding to a telephone number previously specified by the subscriber. If the caller places the call without prefixing the call with the telecommunications carrier code of the telecommunications carrier, the call is completed to the subscriber's telephone. According to another such service, if a caller's call cannot be completed and the caller prefixed his call with the telecommunications carrier code of a telecommunications carrier, then the caller is supplied with a voice mailbox in which he can store a message that can later be retrieved by the called pay. In one embodiment, the telecommunications carrier is an interexchange carrier and the telecommunications carrier code is an IXC access code.

As articulated in the above-cited patent applications, loss of service for non-local service provider activated features can occur if a called party who is a subscriber to such services, e.g., the "follow me anywhere" service, is a subscriber of the same local service provider as the calling pasty. This is because calls between such parties are local calls that are typically dialed without the prefixing of such calls with a telecommunications carrier code, the calls being processed only by the common local service provider. As such, the non-local service provider never gets a chance to invoke its "follow me anywhere" service and the local service provider is not aware that calls to such a subscriber are to be forwarded to another telephone. However, by prefixing even local calls with a telecommunications carrier code, the non-local service provider can check its data base to determine if special processing is to be provided for even a non-long-distance call. If the called party had indeed subscribed to the "follow me anywhere" service, and had stored a telephone number of a telephone to which his calls are to be routed that is not served by the same local service provider that is serving the calling party, the non-local service provider would complete the call to the designated telephone. But, if the called party had subscribed to the "follow me anywhere" service, and had stored the telephone number of a telephone to which his calls are to be routed that is served by the same local service provider as is the calling party, the non-local service provider would supply to the local service provider the stored telephone number. The local service provider could then complete the call to the telephone indicated by the stored telephone number. Moreover, I have recognized that requiring a caller to enter a telecommunications carrier code for each call for which he wishes non-default treatment is cumbersome.

SUMMARY OF THE INVENTION

To overcome these difficulties, in accordance with the principles of the invention, a telephone station set is arranged to have an operating mode in which any calls originated from that telephone station set are automatically supplied, e.g., prefixed, with the telecommunications carrier code of a particular, preselected telecommunications carrier. While at present it is typical only for IXCs to have telecommunications carrier codes, e.g., their IXC access codes, some LECs also have telecommunications carrier codes for particular types of calls that they can carry, e.g., New Jersey Bell has a telecommunications carrier code "I-0-NJB", that is 10652, for calls placed from northern New Jersey to New York City and it is anticipated that other telecommunications carriers may be assigned corresponding telecommunications carrier codes in the future. In one embodiment of the invention, the telephone station set is arranged to have at least one locking button that corresponds to a telecommunications carder and whenever the locking button is in the depressed, or selected, state, any calls originated from that telephone station are automatically prefixed with the telecommunications carrier code of the telecommunications carrier to which the button corresponds.

In some jurisdictions a non-toll call that is not one of the special services (such as the "follow me anywhere" service) is blocked when an IXC access code is prefixed. For those jurisdictions, means are provided to prevent the prefixing of the IXC access code. Whenever there are no buttons corresponding to a telecommunications carrier in the depressed, or selected, state, only that which is dialed by the calling party is transmitted to the LEC to which the telephone station set is connected.

In another embodiment of the invention, the telephone station set is arranged to have a slide switch that has one or more telecommunications carrier positions and a "No Telecommunications Carrier" position. Positioning the slide switch at a telecommunications carrier position causes all calls dialed from the telephone station set to be prefixed by the telecommunications carrier code of the corresponding telecommunications carrier. Positioning the slide switch at the "No Telecommunications Carrier" position causes, for all calls dialed from the telephone station set, only that which is dialed by the calling party to be transmitted to the LEC to which the telephone station set is connected.

In yet a still further embodiment of the invention, a particular telecommunications carrier, or "No Telecommunications Carrier" is selected from a menu provided by the telephone station set on its display. If a particular telecommunications carrier is selected from the menu, all calls dialed from the telephone station set are prefixed by the telecommunications carrier code of the corresponding telecommunications carrier. If "No Telecommunications Carrier" is selected from the menu, the telephone station set transmits to the LEC only that which is dialed by the calling party.

In particular embodiments of the invention, the telecommunications carrier code may be dialed a) when the telephone station set goes off-hook, or b) in response to the initiation of dialing by the calling party.

DETAILED DESCRIPTION

Figure 1:
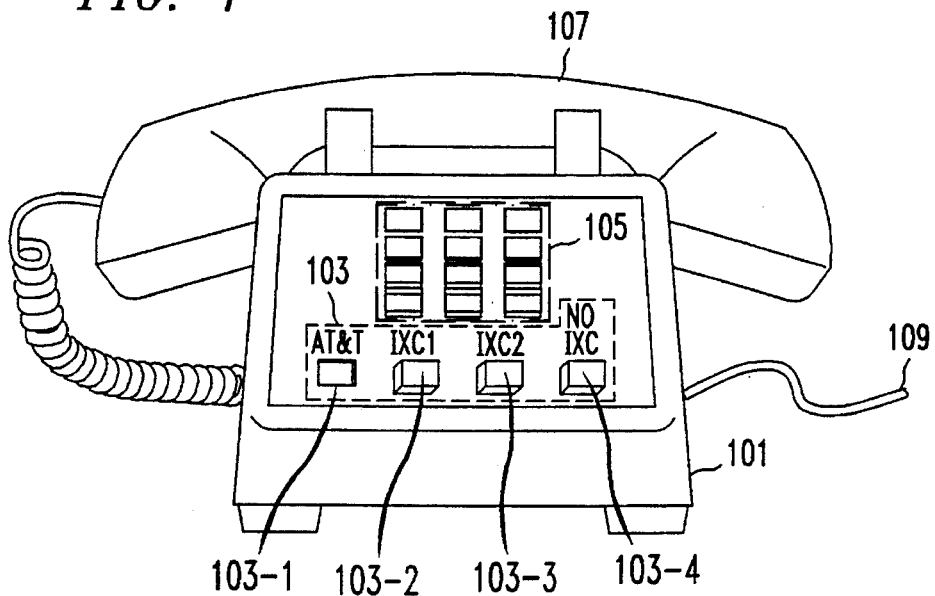
FIG. 1 shows an exemplary telephone station set arranged in accordance with the principles of the invention.

FIG. 1 shows exemplary telephone station set 101 connected to a LEC via telephone line 109 and arranged in accordance with the principles of the invention. Telephone station set 101 includes a) locking buttons 103, including locking buttons 103-1 through 103-4, b) keypad 105 and c) handset 107. Each of locking buttons 103 corresponds to a particular IXC, e.g., AT&T, IXC1 and IXC2, or "No IXC" and are accordingly labeled. Only one of locking buttons 103 can be depressed, or selected, at a time. Selecting one of locking buttons 103, by depressing it, automatically deselects the locking button that had previously been selected.

In accordance with the principles of the invention, whenever one of locking buttons 103-1 through 103-3 is in the depressed, or selected, state, any calls originated from station set 101 are automatically prefixed with the IXC access code of the IXC to which the button corresponds. Whenever locking buttons 103-1 through 103-3 are not depressed, because locking button 103-4 corresponding to "No IXC" is depressed, any previous choice of IXC is canceled and only that which is dialed, e.g., only those digits corresponding to the buttons pressed, by the calling party on keypad 105 are transmitted to the LEC to which the telephone is connected.

Figure 2:
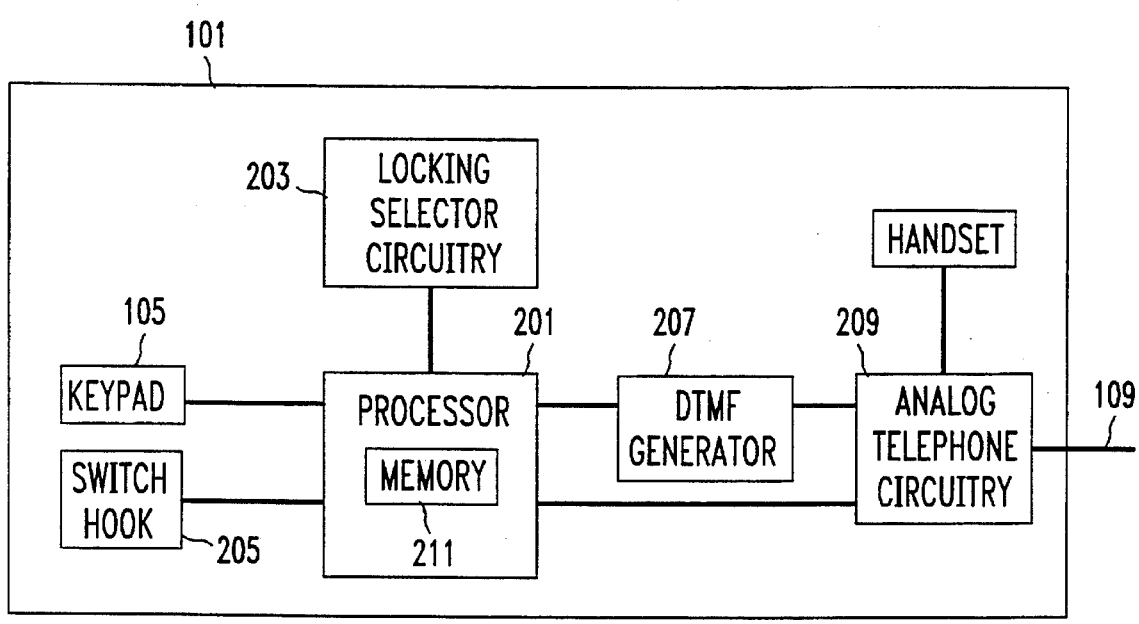
FIG. 2 is a simplified block diagram view of the circuitry of the telephone station set of FIG. 1.

FIG. 2 is a simplified block diagram view of the circuitry of telephone station set 101. Processor 201, which includes memory 211, is connected to locking selector circuitry 203—which, for telephone station set 101 is the electronics of locking buttons 103—, keypad 105, switch hook 205, dual tone multi-frequency (DTMF) generator 207 and analog telephone circuitry 209.

Processor 201 provides all the computational capability necessary to control all the processes of telephone station set 101. Memory 211 stores program code and data for use by processor 201. Processor 201 can determine, independently, a) which buttons, if any, of keypad 105 are pressed, b) the state of the switch hook, i.e., is telephone station set 101 in an on-hook state or an off-hook state, and c) which of locking buttons 103 is depressed. Associated with knowing which locking button is depressed is the knowledge of the IXC access code that would need to be generated by processor 201. Processor 201 can also cause dual tone multi-frequency (DTMF) generator 207 to supply dual tone multi-frequency signals over telephone line 109 via analog telephone circuitry 209. Analog telephone circuitry 209 also causes telephone station set 101 to go on-hook and off-hook in response to commands from processor 201.

Figure 3:
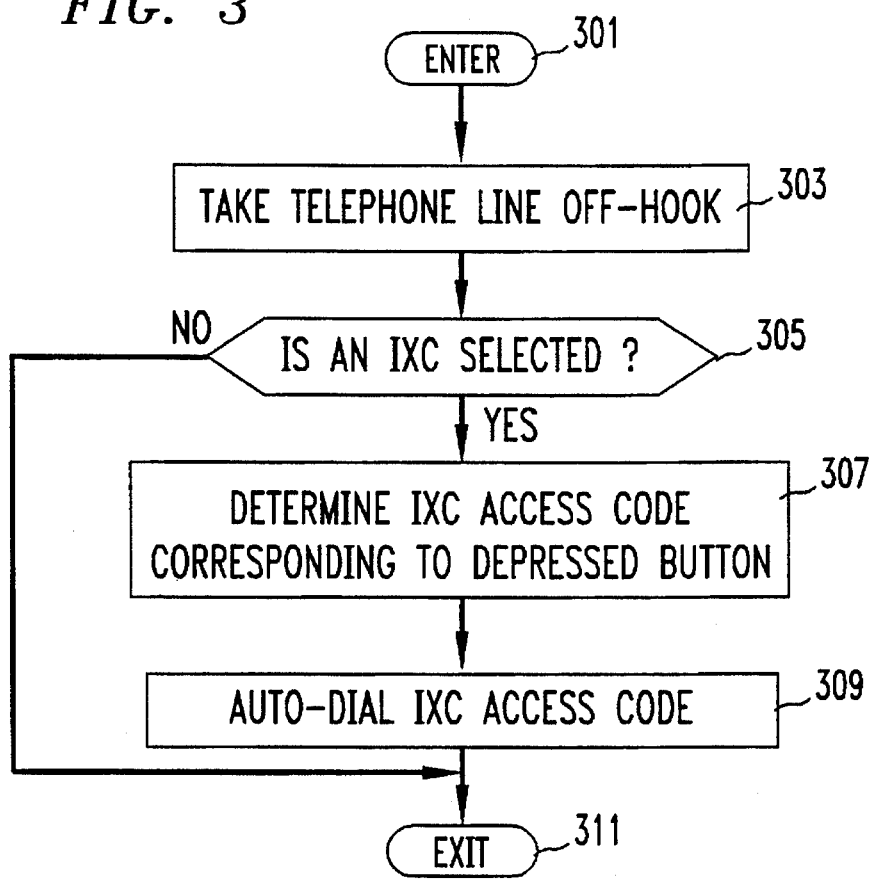
FIG. 3 shows a flow chart of an exemplary process for automatically prefixing onto calls the IXC access code of an IXC for which a locking button is selected, in accordance with the principles of the invention.

FIG. 3 shows a flow chart of an exemplary process for automatically prefixing the IXC access code of the IXC whose one of locking buttons 103 is selected, onto any call originated from telephone station set 101, in accordance with the principles of the invention. The process is entered in step 301 when a caller at telephone station set 101 lifts handset 107. Doing so causes switch hook 205 to generate a signal to which processor 201 can respond. Next, in response to the signal from switch hook 205, processor 201 causes analog telephone circuitry 209 to take telephone station set 101 off-hook on telephone line 109, in step 303. Thereafter, conditional branch point 305 tests to determine if one of locking button 103 corresponding to an IXC is selected.

If the test result in step 305 is YES, indicating that an IXC was preselected, control passes to step 307, in which the IXC access code corresponding to the selected locking button is determined. The access codes are stored in memory 211. In step 309, processor 201 causes dual tone multi-frequency (DTMF) generator 207 to supply tones to telephone line 109, via analog telephone circuitry 209, that correspond to the determined IXC access code. The process then exits in step 311, at which point any digits dialed by the caller at keypad 105 will be supplied over telephone line 109. If the test result in step 305 is NO, indicating that an IXC was not preselected, e.g., "No IXC" locking button 103-4 is depressed, control passes to step 311, and the process is exited. At this point, any digits dialed by the caller at keypad 105 will be supplied over telephone line 109.

It is noted that there need not be a separate "No IXC" locking button. Instead, the "No IXC" condition may be indicated, and any previous choice of IXC is canceled, by not having any of the locking buttons that represent IXCs being depressed. In such an embodiment the "No IXC" condition may be brought about by, for example, depressing any non-selected IXC button one quarter of the way, thereby causing the selected IXC button to become unselected.

It should also be noted that, while FIG. 1 depicts a number of buttons, a single locking button is within the scope of this invention, and this locking button can be a locking push button, or any other two-state on/off switch. In an exemplary embodiment, when the button is locked in the depressed position, the IXC access code is automatically prefixed. When the button is not depressed, then the IXC access code is not automatically prefixed. While this limits the selection to a single IXC, it is quite possible that some people will prefer such an embodiment.

Figure 4:
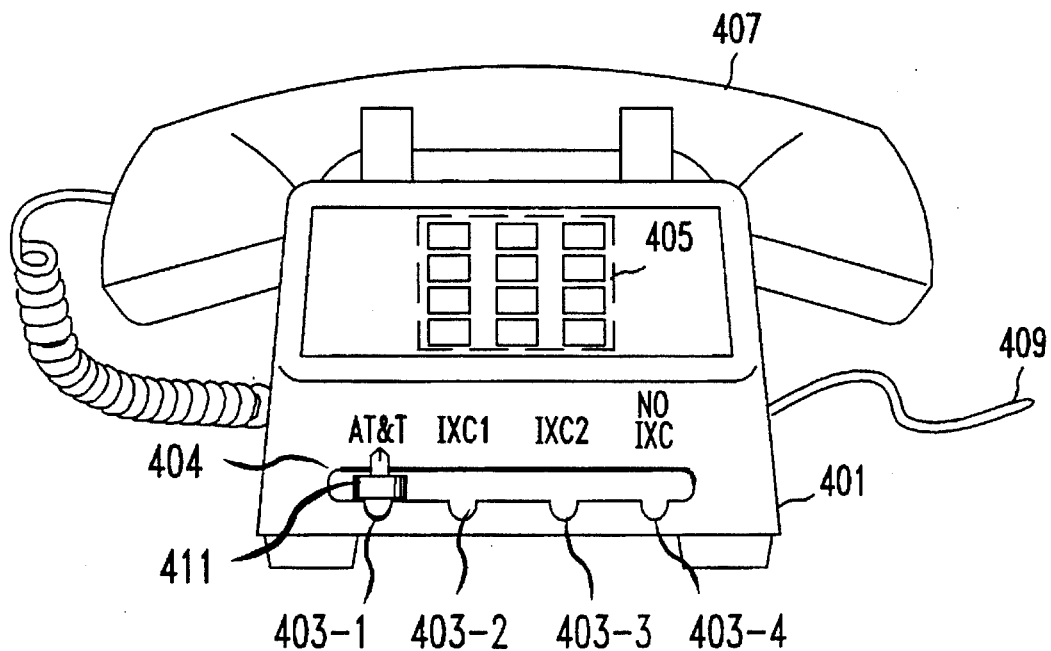
FIG. 4 shows another embodiment of the invention, in which a telephone station set is arranged to incorporate a slide switch.

FIG. 4 shows another embodiment of the invention, in which telephone station set 401 is arranged to incorporate slide switch 404. Slide switch 404 has one or more IXC positions 403-1 through 403-3 and a "No IXC" position 403-4. While arm 411 of slide switch 404 is positioned at a particular one of IXC positions 403-1 through 403-3, all calls dialed from station set 401 are prefixed by the IXC access code of the corresponding IXC. Positioning arm 411 of slide switch 404 at the "No IXC" position causes, for all calls dialed from telephone station set 401, only that which is dialed by the calling party to be transmitted to the LEC to which telephone station set 401 is connected by telephone line 409. Thus, any previous choice of an IXC is canceled. The circuit configuration of telephone station set 401 is the same as that for telephone station set 101, shown in FIG. 2, except that locking selector circuitry 203 is the circuitry of slide switch 404 instead of that of locking buttons 103.

Figure 5:
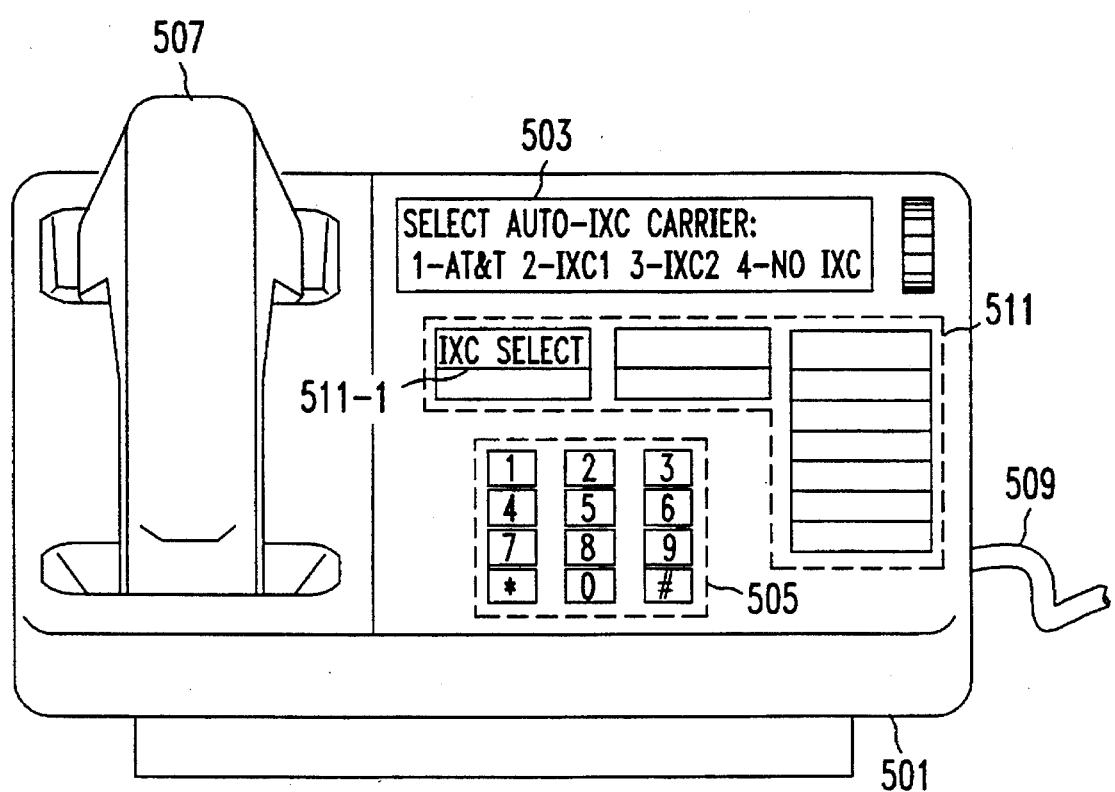
FIG. 5 shows yet another embodiment of the invention, in which a particular IXC, or "No IXC" is selected by using a menu provided on the display of a telephone station set.

Shown in FIG. 5 is yet another embodiment of the invention, in which a particular IXC, or "No IXC" is selected by using a menu provided on display 503 of telephone station set 501. Upon pressing IXC select button 511-1, the user is given a choice of several IXCs, e.g., AT&T, IXC1 and IXC2, and "No IXC", in the manner shown. The user selects his choice by pressing the appropriate key on keypad 505. If a particular IXC is selected from the menu, all calls dialed from telephone station set 501 are prefixed by the IXC access code of the corresponding IXC. If "No IXC" is selected from the menu, when a call is made from telephone station set 501 only that which is dialed by the calling party is transmitted to the LEC. Thus, any previous choice of an IXC is canceled. It is noted that, not only the keypad but other forms of input, such as touch screen, voice recognition, or so-called "softkeys" may be used to register the user's selection.

In each of the above described embodiments, the particular IXC access codes may either be fixed in the telephone station set during its manufacture or they may be stored in the telephone station set by following a set of steps for doing so. Those skilled in the art will know how to implement such programming steps.

For example, they can parallel the steps, or protocol, employed in the AT&T Answering System Telephone 1532 for remote programming of the telephone, via the telephone lines, to play back a recordedmessage in response to a predesignated sequence of DTMF signals. Such programming of the AT&T Answering System Telephone 1532 can be done remotely. Similarly, the programming of the FIGS. 1 and 4 telephones can be done remotely.

In fact, to assist customers, a purchaser of the FIGS. 1 or 4 telephones can be instructed to connect the purchased telephone to the telephone network and to dial with it a given number. When that number is dialed, the customer informs the equipment (or the oparator) of the IXC access code or codes that are to be inserted into the telephone, and the equipment at that number proceeds to program the connected telephone by transmitting the necessary signals.

Figure 6:
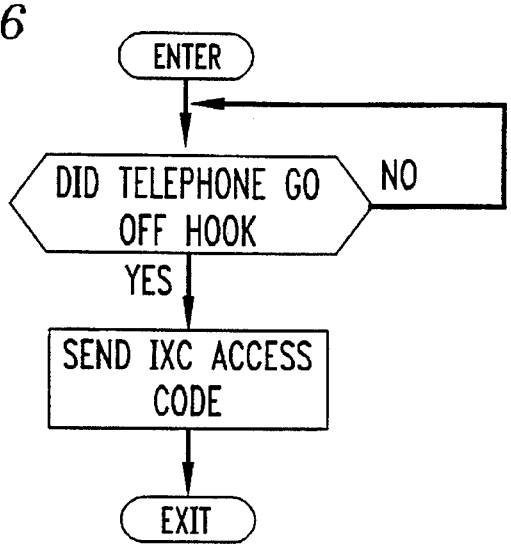
FIG. 6 shows a flow chart of a simplified exemplary process for use in a telephone embodying the principles of the invention.
Figure 7:
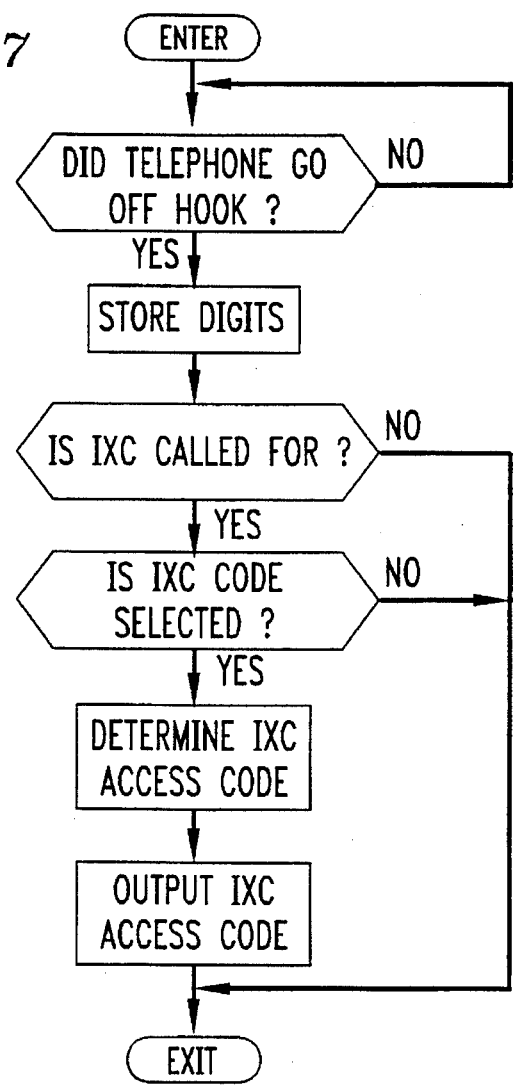
FIG. 7 shows a flow chart of an exemplary process by which the IXC access code is automatically dialed when the caller dials a telephone number for which it can be determined that the IXC access code should be automatically supplied.

The invention may be implemented so that the IXC access code is dialed immediately after the telephone station set goes off-hook, per FIG. 3 or FIG. 6. Alternatively, the transmitting of the IXC access code may be delayed until the dialing of an initial digit by the caller, at which point the IXC access code and the dialed digits are sent in "senderized" fashion, i.e., the dialed digits are collected and are then sent sequentially, albeit delayed, after transmission of the IXC access code. Furthermore, the invention may be implemented so that the IXC access code is only dialed if the prefix code for long-distance, e.g., a leading 1, is dialed by the calling party. This can be implemented by adding an additional conditional branch point after step 303 which tests for the first digit dialed being the long-distance prefix. If the test result is NO, the process exits in step 311. If the test result is YES, the process continues at conditional branch point 305. This is shown in FIG. 7.

Additionally, the invention can be implemented so that before automatically dialing out an IXC access code, the telephone station set waits to determine if the caller dialed an IXC access code. An access code might be dialed, even though one was selected at the telephone station set, by someone who was unfamiliar with telephone station sets that automatically dialed IXC access codes or by someone who wanted to override the selected IXC for just one call. If it is determined that the calling party dialed an IXC access code, the telephone station set will not automatically dial the access code of the selected IXC for the call. Instead, only that which is dialed by the calling party will be transmitted to the LEC to which the telephone station set is connected. However, if it is determined that the calling party did not dial an IXC access code, the telephone station set will automatically prefix the access code of the selected IXC to that which the calling party dialed.

Figure 8:
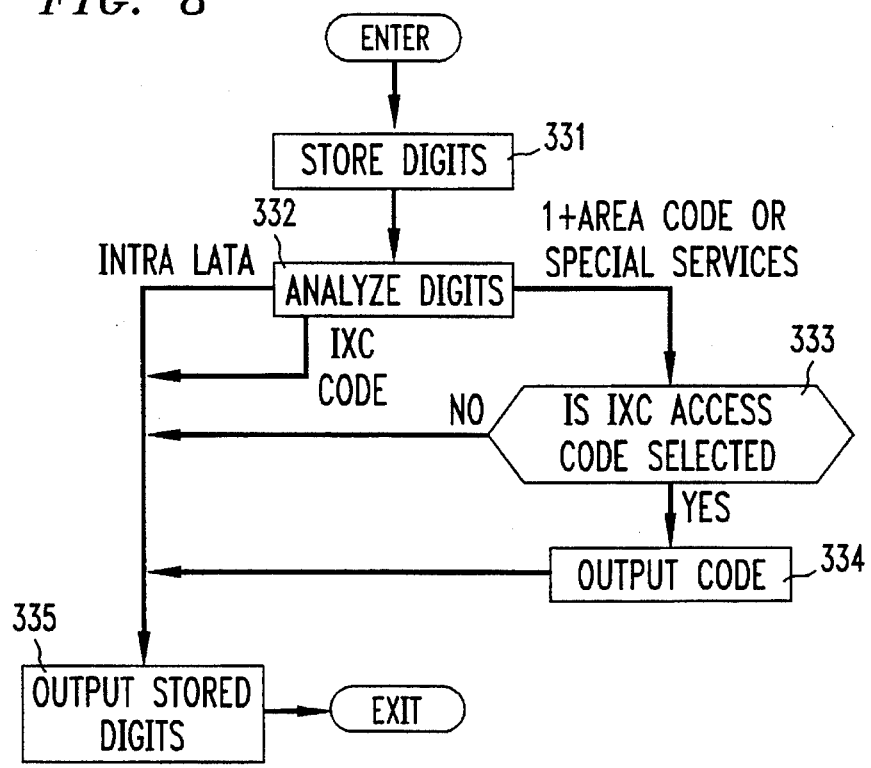
FIG. 8 shows a flow chart of an exemplary process by which a telephone determines whether or not to automatically supply an IXC access code.

The process just described is shown in diagrammatic form in FIG. 8. Step 331 stores dialed digits, and step 332 analyzes the digits. When it is determined that the user dialed a "1" plus an area code, or requested a service where inserting an IXC access code may be of benefit, control passes to step 333 where it is determined whether an IXC access code was selected. If it was selected, then control passes to step 334 which outputs the selected and prestored IXC access code. Thereafter, control passes to step 335 which outputs the stored digits.

Figure 9:
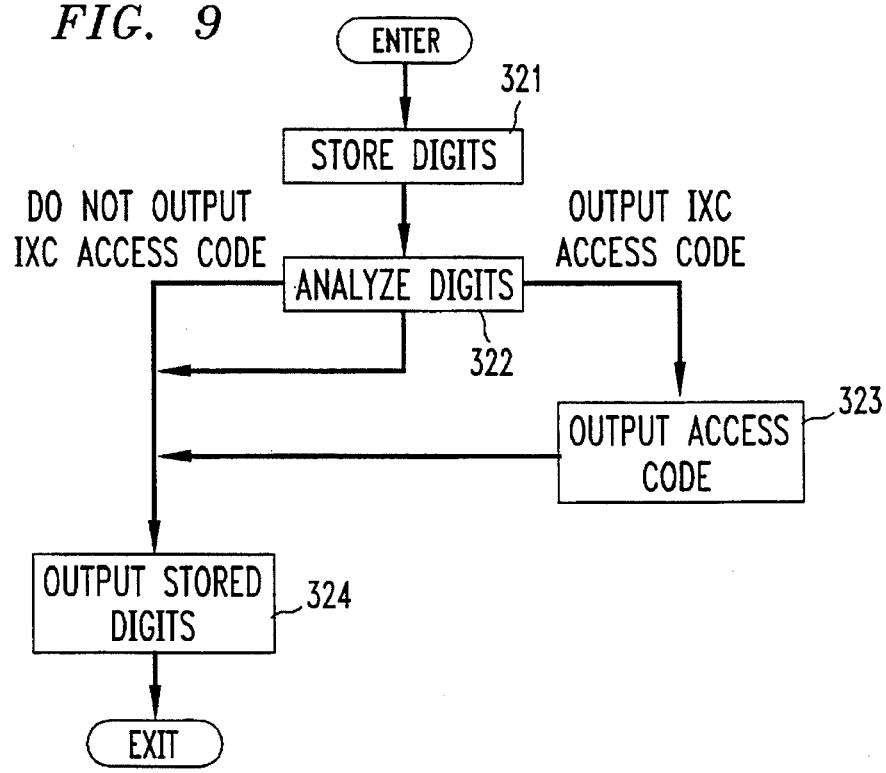
FIG. 9 shows a flow chart for a process equivalent to that shown in FIG. 8 but focusing on when not to supply the IXC access code.

It may be noted that FIG. 8 includes three paths that lead to the decision not to output the IXC access code. FIG. 9 presents the equivalent flow chart that highlights this fact.

FIG. 9 also allows one to focus on an alternative view of the invention, in which the consideration is when NOT to output the IXC access code, rather than when to output the IXC access code. With this focus in mind, it can simply be seen that the IXC access code is NOT automatically supplied when the user actively wishes it to not be so supplied (such as when the user dials in an IXC access code), or when the local exchange carrier's equipment cannot handle receipt of an IXC access code. As indicated above, there are jurisdictions where an intra-LATA call cannot be handled by the LEC equipment when an IXC access code is provided. However, this is likely to change in the future.

Although dual tone multi-frequency signaling has been shown, the invention may be used with pulse dialing as well as with other digital signaling formats, e.g., the ISDN signaling format. Also, embodiments of the invention may be developed by those skilled in the art wherein the functionality of the invention is divided between the telephone station set and a private branch exchange (PBX) to which the telephone station set is connected. The PBX is, in turn, connected to the LEC.

It is noted that the IXC access code has been indicated to be prefixed before any other numbers are dialed. This is because that is the place that the telephone networks currently operated by the expect to receive the IXC access code. However, the invention is intended to include embodiments when the IXC access code is not expected to be the first portion of number transmitted to the LEC. In that case the IXC code would be inserted at the appropriate place within the dialed digit stream.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A telephone station set for use in connecting a caller to the network of a local service provider, the telephone station set comprising:

multi-position selection means for registering a selection of a telecommunications carrier other than said local service provider to carry future telecommunications calls originated from said telephone station set and carried by a telecommunications carrier other than said local service provider, said selection remaining in effect, for all subsequent calls, until explicitly changed; and means for automatically supplying from said telephone station set the telecommunication carrier code of said selected telecommunications carrier to said network of said local service provider during all calls originated after registration of said selection that are to be carried by a telecommunications system other than said local service provider.

2. The telephone station set as defined in claim 1, wherein said multi-position selection means for registering a selection includes at least one locking button.

3. The telephone station set as defined in claim 1, wherein said multi-position selection means for registering a selection includes a slide switch having a plurality of positions.

4. The telephone station set as defined in claim 1, wherein said multi-position selection means for registering a selection includes a menu system.

5. The telephone station set as defined in claim 1, wherein said means for supplying supplies said telecommunications carrier code in response to said telephone station set going off-hook.

6. The telephone station set as defined in claim 1, wherein said means for supplying supplies said telecommunications carrier code in response to the dialing of a first digit for a telephone call originated from said telephone station set.

7. The telephone station set as defined in claim 1, further including means for canceling said selection so that telecommunications carrier codes are not automatically supplied on calls.

8. The telephone station set as defined in claim 1, wherein said telecommunications carrier is an interexchange carrier.

9. The telephone station set as defined in claim 8, wherein said means for automatically supplying supplies the telecommunications carrier code for said interexchange carrier even for non-interexchange calls.

10. A telephone station set for use in connecting a caller to the network of a local service provider, the telephone station set comprising:

multi-position selection means for registering a selection of a telecommunications carrier other than said local service provider to carry future telecommunications calls originated from said telephone station set, said selection remaining in effect, for all subsequent calls, until explicitly changed; and means for automatically supplying from said telephone station set the telecommunications carrier code of said selected telecommunications carrier to said network of said local service provider during calls original after registration of said selection; and means, in said telephone station set for inhibiting said means for automatically supplying if said caller dialed a telecommunications carrier code.

11. The telephone station set as defined in claim 10, wherein said multi-position means for registering a selection includes at least one locking button and said means for canceling includes another one locking button.

12. The telephone station set as defined in claim 10, wherein said multi-position means for registering a selection includes a slide switch having a plurality of positions and said means for canceling includes an additional position on said slide switch.

13. The telephone station set as defined in claim 10, wherein said multi-position means for registering a selection includes a menu system and said means for canceling includes a particular menu selection and corresponding input device.

14. A method comprising the steps of:

registering, via multi-position selection means in a telephone station set, a selection of a telecommunications carrier to carry all subsequent interexchange calls originated from said telephone station set until said selection is explicitly changed; and automatically transmitting from said telephone station set the telecommunications carrier code of said selected telecommunications carrier to a network of a local service provider for every call originated from said telephone station set.

15. A method comprising the steps of:

registering, via multi-position selection means in a telephone station set, a selection of an interexchange carrier to carry all subsequent interexchange calls originated from said telephone station set until said selection is explicitly changed; and automatically transmitting from said telephone station set the interexchange carrier code of said selected interexchange carrier to a network of a local service provider for each interexchange carrier and non-interexchange carrier call originated from said telephone station set.

16. The method as defined in 15, wherein said automatic transmission is initiated upon the going off-hook by said telephone station set.

17. The method as defined in claim 15, wherein said automatic transmission is performed in response to the dialing of a first digit for a telephone call originated from said telephone station set.

18. A method for use in a telephone apparatus, the method comprising the steps of:

receiving, in said telephone apparatus, an indication that a particular interexchange carrier is to carry all interexchange calls originated from a telephone station set served by said apparatus; and automatically supplying from said telephone apparatus, based upon the position of multi-position selection means within said telephone apparatus, the interexchange carrier code of said particular interexchange carrier to a network of a local service provider during interexchange carrier and non-interexchange carrier calls.

19. The method as defined in claim 18, wherein said automatic supplying is performed in response to the dialing of a first digit for a telephone call originated from said telephone apparatus.

\* \* \* \* \*